United States Patent
Filter

[11] 3,952,544
[45] Apr. 27, 1976

[54] SHAFT-CONNECTING CHAIN COUPLING

[75] Inventor: Walther Filter, Langenhagen, Germany

[73] Assignees: Vereinigte Osterreichische Eisen-und Stahlwerke - Alpine Montan Aktiengesellschaft, Vienna, Austria; Etablissement Wanderfield & Co., Schaan, Liechtenstein

[22] Filed: June 27, 1974

[21] Appl. No.: 483,685

[30] Foreign Application Priority Data

July 25, 1973   Austria ............................ 6563/73

[52] U.S. Cl. .................................. 64/19; 74/258
[51] Int. Cl.² ..................... F16D 3/70; F16H 57/04
[58] Field of Search ............ 64/19, 6; 403/322, 324, 403/325, 328, 329, 315, 316; 74/412, 258

[56] References Cited
UNITED STATES PATENTS

| | | |
|---|---|---|
| 593,872 | 11/1897 | Barnhart ............................... 74/258 |
| 2,451,683 | 10/1948 | Mantle ................................... 64/19 |
| 2,784,573 | 3/1957 | Anderson ................................ 64/6 |
| 2,811,858 | 11/1957 | Cink ..................................... 74/258 |
| 3,167,935 | 2/1965 | Fawick .................................. 64/19 |
| 3,213,529 | 10/1965 | Gill ..................................... 74/258 |
| 3,309,898 | 3/1967 | Fehrmann et al. ...................... 64/19 |
| 3,520,151 | 7/1970 | Resener ................................. 64/19 |
| 3,528,526 | 9/1970 | Resener ................................. 64/19 |
| 3,694,011 | 9/1972 | Silverman ............................ 403/328 |
| 3,800,555 | 4/1974 | Arneson ................................. 64/6 |

*Primary Examiner*—Samuel Scott
*Assistant Examiner*—A. Russell Burke
*Attorney, Agent, or Firm*—Kurt Kelman

[57] ABSTRACT

A chain is trained around two substantially coaxial sprockets. A chain fastener comprises two fastener members connected to respective ends of the chain and a locking pin adapted to assume a first position, in which the locking pin locks the two fastener members together, and a second position, in which the locking pin permits the two fastener members to be separated from each other. The locking pin is movable between the first and second positions in a plane which is normal to the axis of the sprockets.

4 Claims, 2 Drawing Figures

U.S. Patent  April 27, 1976  3,952,544
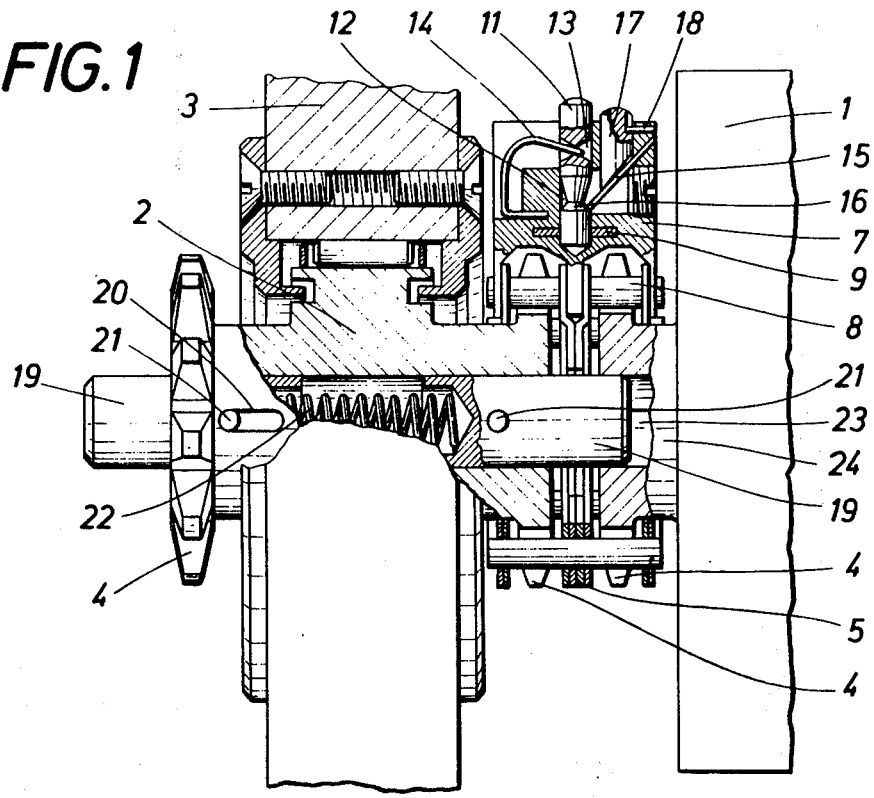
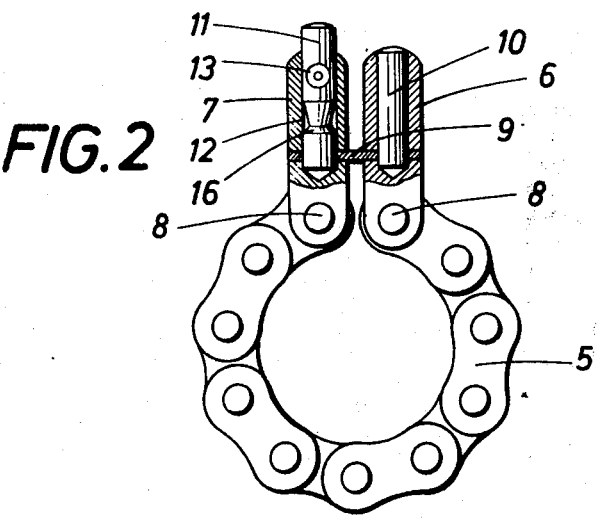

SHAFT-CONNECTING CHAIN COUPLING

This invention relates to a chain fastener for a chain of a shaft-connecting chain coupling which comprises sprockets mounted on confronting ends of aligned shafts and a chain trained around both sprockets.

Such shaft-connecting chain couplings have the advantage that they provide for an elastic transmission of torque, that they can be disengaged quickly by a simple opening of the chain, that they keep the axial shaft play below a small, permissible limit, and that they enable a connection even between slightly misaligned shafts. To engage the coupling, the chain is trained around the sprockets on the shafts to be coupled and the ends of the chain are connected by means of a chain pin, by which the open end link plates of the chain are hingedly connected. As this chain pin which closes the chain obviously must be inserted in the direction of the axis of the two shafts, such shaft-connecting chain couplings can be used only where there is a sufficiently large space for the insertion of the chain pin beside the chain. Whereas the shaft-connecting chain couplings could be used to advantage in weaving machines for coupling adjacent sections of rotary beams, the surface for guiding the warp threads or the cloth should extend as far as possible throughout the weaving width so that there are only small spaces between the shaft sections for the coupling means. For this reason, the coupling chain cannot be closed by an axially insertable chain pin. This fact has prevented the use of shaft-connecting chain couplings in rotary beams of weaving machines if these beams are required to have a guiding surface which extends as far as possible throughout the weaving width.

It is an object of the invention to provide for a chain of a shaft-connecting chain coupling a chain fastener which can be closed and opened in a simple manner even if there is only a small space laterally beside the coupling.

This object is accomplished according to the invention in that the chain carries at each end a fastener member and these fastener members are connected by a locking pin which is adapted to be inserted and removed in a plane which is normal to the axis of the shafts, preferably in a radial direction. Because the locking pin is adapted to be inserted in a plane that is normal to the axis of the shafts, there is no need for any lateral space for engaging and releasing the coupling as the two fastener members and the locking pin may be disposed in the plane of symmetry of the coupling.

A particularly simple structure will be obtained in accordance with an optional feature of the invention if the means for connecting the two fastener members comprise a keeper, which is provided on one of said fastener members and extends in the direction of the chain and into a mating aperture in the other fastener member and is held there by the locking pin which extends into an aperture that is formed in the keeper on an axis which is radial with respect to the axis of the shafts. This arrangement within the scope of the invention ensures that the two fastener members can be simply connected in the proper position so that the locking pin can be inserted without difficulty.

In an optional embodiment of the invention the locking pin is biased in a releasing sense by a return spring and is held in its locking position against the force of the return spring by a leaf spring or the like, which, after the insertion of the locking pin, snaps automatically behind a detent stop of the locking pin. In that case, when it is desired to close the coupling chain, it will be sufficient to bring the two fastener members together and to insert the locking pin because the locking pin is automatically held in its locking position when it has been inserted. To release the locking pin, the leaf spring or the like must be removed from the detent stop. Thereafter the return spring forces the locking pin out of its locking position so that the chain fastener is automatically opened.

If, in accordance with the invention, a release pin is provided to force the leaf spring of the like from the detent stop, the chain fastener can be closed and opened simply by the application of pressure to the locking pin and the release pin, respectively, no tool being required for this purpose.

As the chain fastener is opened, the return spring should not force the locking pin out of the associated fastener member because in that case the locking pin would have to be re-inserted into the corresponding guide bore when the fastener is to be closed. For this reason it is an optional feature of the invention that the return spring consists of a U-shaped spring which is gripped at one end and which at its other end, extends into a double-conical transverse bore of the locking pin. When the leaf spring has released the locking pin, in such an arrangement, the locking pin is pushed out of the aperture in the keeper by the return spring but the locking pin is held in its guide bore in the fastener member because the excursion of the U-shaped spring is correspondingly small. The double-conical transverse bore in the locking pin permits of a free deflection of the free end of the U-shaped spring during the movement of the locking pin along a straight line. It will be understood that the leaf spring may be replaced by a bar spring, a spring wire, or the like.

An embodiment of the invention is shown diagrammatically and by way of example in the accompanying drawing, in which FIG. 1 is an axial sectional view showing a shaft-connecting chain coupling according to the invention and FIG. 2 is a side elevation, partly in section, showing a closed coupling chain.

To connect a rotary beam 1 of a weaving machine to a shaft 2 carried by a central support 3, sprockets 4 are mounted on the confronting ends of stub shaft 24 of beam 1 and shaft 2 and a common coupling chain 5 is trained around both sprockets. That coupling chain 5 consists in the usual manner of a sprocket chain and carries fastener members 6 and 7 at respective ends. These fastener members 6 and 7 are pivoted to the end link plates of the chain 5 by chain pins 8.

Fixing pin 10 mounts keeper 9 in the fastener member 6. The keeper 9 extends into a mating aperture of the other fastener member 7 and is held therein by a locking pin 11 which extends through a mating aperture in the keeper. The locking pin 11 is guided in a guide bore 12 which extends in a plane that is normal to the axis of the shafts 1 and 2. For this reason there is no need for a space laterally beside the coupling to permit of the insertion of the pin 11. The locking pin 11 is moved in the plane of symmetry of the coupling in a direction which is radial to the shaft axes.

The locking pin 11 has a double-conical transverse bore 13. A U-shaped return spring 14 is gripped at one end in the fastener member 7 and with its free end extends into the transverse bore 13 to bias the pin 11 radially outwardly. A leaf spring 15 is also mounted in the fastener member 7 and, as the locking pin 11 is inserted, slides along the same and automatically snaps behind a detent stop formed by a shoulder 16. As a result, the locking pin is locked in its locking position by the leaf spring 15 and cannot come loose. To release the locking pin, a release pin 17 is operated to force the leaf spring 15 away from the detent stop so that the pin 11 is released and the prestressed return spring 14 pushes the pin 11 out of the aperture in the keeper 9, which is thus released. To close the fastener, it is sufficient to force the pin 11 into the fastener member 7 until the leaf spring 15 snaps in behind the detent stop. To prevent release pin 17 from falling out of its guide bore during the rotation of the shafts, the release pin is held by a retaining pin 18 which extends into a guide groove formed in the release pin.

To insert the rotary beam 1, a centering pin 19 slidably mounted in the hollow shaft 2 is depressed into the shaft 2 against the force of a spring 22 by a pin 21 which is guided in an axial slot 20 in the shaft 21. The rotary beam 1 is then moved to its operating position, in which the centering pin 19 is released to extend into a centering bore 23 of the stub shaft 24 of the rotary beam 1. The chain 5 is then trained around the two chain sprockets 4, the keeper 9 is inserted into the receiving opening of the fastener member 7, and the chain fastener is closed by depressing the locking pin 11 as described hereinbefore. When it is desired to remove the rotary beam 1, it is sufficient to depress the release pin 17 so that the chain fastener is opened. When the coupling chain 5 has been removed and the centering pin 19 has been depressed into the shaft 2, the rotary beam can be removed.

What is claimed is:

1. In a chain coupling for connecting two shafts, which comprises two substantially coaxial sprockets, a chain trained around the sprockets, and a chain fastener comprising two fastener members connected to respective ends of the chain, the improvement of one of the fastener members defining an aperture, a keeper mounted in the other fastener member and extending in the longitudinal direction of the chain, the keeper being matingly received in the aperture and defining an aperture having an axis normal to the axis of the sprockets, and a locking pin adapted to assume a first position, in which the locking pin locks the two fastener members together, and a second position, in which the locking pin permits the two fastener members to be separated from each other, the locking pin being movable between the first and second positions in a plane normal to the axis of the sprockets, and the locking pin extending into the aperture in the keeper in the first position and being disposed outside the aperture in the keeper in the second position.

2. In the chain coupling of claim 1, the locking pin being movable between the first and second positions in a direction radial to the axis of the sprockets.

3. In the chain coupling of claim 1, a return spring arranged to bias the locking pin from the first into the second position, a detent stop on the locking pin, and a resilient detent means biased to snap in behind the detent stop as the locking pin reaches the first position to hold the locking pin in the first position against the bias of the return spring.

4. In the chain coupling of claim 3, the locking pin defining a double-conical transverse bore and the return spring being U-shaped, one end of the U-shaped return spring being gripped and the other end thereof extending into the transverse bore.

* * * * *